US012542392B2

(12) United States Patent
Kassner

(10) Patent No.: US 12,542,392 B2
(45) Date of Patent: Feb. 3, 2026

(54) ELECTRICAL CONNECTOR, CONTACT INSERT AND METHOD FOR PRODUCING AN ELECTRICAL CONNECTOR

(71) Applicant: Franz Binder GmbH + Co. Elektrische Bauelemente KG, Neckarsulm (DE)

(72) Inventor: Matthias Jürgen Kassner, Neckarsulm (DE)

(73) Assignee: Franz Binder GmbH + Co. Elektrische Bauelemente KG, Neckarsulm (DE)

( * ) Notice: Subject to any disclaimer, the term of this patent is extended or adjusted under 35 U.S.C. 154(b) by 383 days.

(21) Appl. No.: 18/169,607

(22) Filed: Feb. 15, 2023

(65) Prior Publication Data

US 2023/0268684 A1 Aug. 24, 2023

(30) Foreign Application Priority Data

Feb. 18, 2022 (DE) ..................... 10 2022 201 723.4

(51) Int. Cl.
*H01R 13/436* (2006.01)
*H01R 43/20* (2006.01)
*H01R 13/6581* (2011.01)

(52) U.S. Cl.
CPC ......... *H01R 13/4364* (2013.01); *H01R 43/20* (2013.01); *H01R 13/6581* (2013.01)

(58) Field of Classification Search
CPC . H01R 13/4364; H01R 13/6581; H01R 43/20
USPC ..................................................... 439/607.01
See application file for complete search history.

(56) References Cited

U.S. PATENT DOCUMENTS 4,046,451 A * 9/1977 Juds ..................... H01R 24/564 439/429
5,137,470 A * 8/1992 Doles ................... H01R 24/566 439/578
5,154,636 A * 10/1992 Vaccaro ............... H01R 24/566 439/578
5,354,217 A * 10/1994 Gabel .................. H01R 24/564 439/583
5,503,569 A 4/1996 Huss, Jr. et al.
2005/0170692 A1* 8/2005 Montena .............. H01R 9/0521 439/578
2008/0170346 A1* 7/2008 Van Swearingen ...... H01G 4/06 29/25.03

(Continued)

FOREIGN PATENT DOCUMENTS

CN 105846210 A * 8/2016 ........... H01R 13/424
CN 106848614 A 6/2017
CN 107666081 A * 2/2018 ........... H01R 13/521

(Continued)

OTHER PUBLICATIONS

Extended European Search Report for EP Application No. 23152438.0, dated Jul. 6, 2023, 8 pages.

*Primary Examiner* — Peter G Leigh
(74) *Attorney, Agent, or Firm* — Seed Intellectual Property Law Group LLP

(57) ABSTRACT

An electrical connector includes a locking unit and a contact insert at least partially surrounded by the locking unit. At least one contact is arranged in and/or on the contact insert. The contact insert is formed from a contact body and a contact sleeve connected to the contact body. Furthermore, a contact insert and a method for producing an electrical connector are described.

19 Claims, 7 Drawing Sheets

(56) References Cited

U.S. PATENT DOCUMENTS

2011/0003507 A1* 1/2011 Van Swearingen .... H01Q 1/246
164/76.1

FOREIGN PATENT DOCUMENTS

| | | | | | |
|---|---|---|---|---|---|
| CN | 107732509 | A | | 2/2018 | |
| CN | 109149417 | A | | 1/2019 | |
| CN | 109980415 | A | | 7/2019 | |
| CN | 109980429 | A | * | 7/2019 | ............. H01R 13/02 |
| CN | 112736596 | A | | 4/2021 | |
| DE | 93 08 457 | U1 | | 7/1993 | |
| DE | 200 12 285 | U1 | | 11/2001 | |
| DE | 202016102392 | U1 | * | 8/2016 | ........... H01R 13/504 |
| EP | 0551092 | B1 | * | 7/1993 | ........... H01R 24/566 |
| EP | 1503462 | A1 | * | 2/2005 | ......... H01R 13/5837 |

* cited by examiner

ELECTRICAL CONNECTOR, CONTACT INSERT AND METHOD FOR PRODUCING AN ELECTRICAL CONNECTOR

BACKGROUND

Technical Field

The present disclosure relates to an electrical connector with a locking unit and a contact insert at least partially surrounded by the locking unit.

In addition, the present disclosure relates to a contact insert for an electrical connector.

Furthermore, the present disclosure relates to a method for producing an electrical connector.

Description of the Related Art

Electrical connectors of the type in question are known from practice and are used, for example, with SPE-specific (single-pair Ethernet) interfaces and also with different threaded connections, for example M8 or M12, with K coding or L coding, in particular connected to a mating connector.

For use in automation technology, the data volumes to be transmitted by such a connector are relatively small; the significant factors rather being a low price, a small space requirement and a simple installation. The above criteria are not fulfilled or only partially fulfilled by known electrical connectors.

BRIEF SUMMARY AND GENERAL DESCRIPTION

The present disclosure is directed to an electrical connector of the type mentioned at the outset in such a way that, with structurally simple means, an electrical connection that is inexpensive to produce and requires only a small space requirement can be realized. Furthermore, a contact insert and a method for producing an electrical connector are specified.

According to the disclosure, an electrical connector comprises a locking unit and a contact insert at least partially surrounded by the locking unit, wherein at least one contact is arranged in and/or on the contact insert and wherein the contact insert is formed from a contact body and a contact sleeve connected to the contact body.

A contact insert for an electrical connector is also described, in particular for an electrical connector, comprising a contact body and a contact sleeve connected to the contact body.

Additionally, described herein is a method for producing an electrical connector, which in at least one implementation has the following method steps:

- providing a contact sleeve, in particular inserting the contact sleeve into an assembly tool,
- pushing a locking unit onto the contact sleeve, in particular up to a stop on the contact sleeve,
- inserting a contact body into the locking unit up to the contact sleeve, in particular inserting a probe region of the contact body into a receiving region of the contact sleeve,
- introducing at least one contact into the contact body.

In a manner according to the present disclosure, it has firstly been recognized that an underlying object of the disclosure can be achieved in a surprisingly simple way by the contact insert being formed in several parts. In contrast to a one-piece contact insert, the problem thus does not arise of the contact insert having to be pressed through an opening of the locking unit, whereby the necessary undercuts are regularly damaged. Nor is there the problem of the circumferential stop on the mating-side contact insert having to be strongly compressed, whereby a coding possibly located at this point is damaged. Instead, it is possible in a manner according to the disclosure for the contact body and the contact sleeve to be introduced into the locking unit on the connection side and on the mating side and there be connected together indirectly or directly, for example in a form-fitting and/or force-fitting manner. As a result, an extremely compact and easy-to-manufacture electrical connector is realized. Furthermore, the contact insert can be of modular design so that, depending on the desired connection type, for example only the connection-type-specific contact body needs to be selected. Different connection types, such as crimping, soldering, a threaded clamping connection or a cage clamp terminal, can thus be realized with little effort. It is conceivable here that the mating-side contact sleeve can be used universally. The contact can be, for example, a contact pin or a socket contact.

The contact body can advantageously have a probe region which can be inserted into a receiving region of the contact sleeve. Alternatively, the contact sleeve can have a probe region which can be inserted into a receiving region of the contact body. In this way, a particularly good connection between contact body and contact sleeve can be realized. A further advantage is that the material thickness of the probe region and the receiving region can in each case be optimized with regard to criteria such as compliance with contact forces, dielectric strength due to greater wall thicknesses, UL requirements, and also with regard to manufacturability, for example dimensional accuracy, minimization of the distortion of plastic parts, injection-molding of thin wall thicknesses, etc. The production-related and electrical or mechanical product requirements of the electrical connector can thus be fulfilled in their entirety. In other words, it is conceivable that contact body and contact insert can be at least partially pushed into one another.

In a further advantageous manner, the contact body can be connected to the contact sleeve in a form-fitting and/or force-fitting manner. Alternatively or additionally, the contact can be connected in a form-fitting and/or force-fitting manner to the contact body and/or to the contact sleeve. According to a particularly preferred development, the connection between contact body and contact sleeve is effected by the contact which is introduced into the contact body. In this case, the contact can be connected either exclusively to the contact body, for example in a form-fitting and/or force-fitting manner, and press the contact body or the probe region outward against the contact sleeve or the receiving region, or in addition to the contact sleeve, for example in a form-fitting and/or force-fitting manner.

According to a further advantageous embodiment, it is conceivable that at least one projecting holding element, for example a holding claw, is formed on an inner side of the contact sleeve and/or on an outer side of the contact body in order to realize a form-fitting and/or force-fitting connection between contact sleeve and contact body. Alternatively or additionally, at least one projecting holding element, for example a holding claw, could be formed on an outer side of the contact and/or on an inner side of the contact body or the contact sleeve in order to realize a form-fitting and/or force-fitting connection between contact body or contact sleeve and contact. If the contact is also connected to the contact sleeve, corresponding holding elements could alternatively or additionally be formed on the contact and/or on the contact sleeve. The formation of latching elements on the contact insert can thus be dispensed with. This has the advantage that, when the parts made of plastic are produced, the molds for producing the contact body and the contact sleeve can be designed in a simpler and more cost-effective manner. Instead of a sliding-split mold, a so-called open-close mold can be designed, which results in inexpensive products, in particular in the case of multi-cavity molds. Further advantageously, no latching elements could be arranged for connecting contact body and contact sleeve and/or contact insert and locking unit, as a result of which the actual assembly of the contact insert, in particular with regard to possible automation solutions, is particularly easy to carry out and the device overall is of simple design and small in size. A further advantage of the connection between contact body and contact sleeve via the contact or via the contact is that the adaptation of contact (holding element) and contact sleeve needs to be carried out just once, without the necessity of changing the entire electrical connector. Depending on the connection type desired, the contact body can be structurally modified without further revisions being necessary.

In a particularly advantageous manner, the contact insert can be connected to the locking unit in a form-fitting and/or force-fitting manner. In particular, a stop can be formed on the contact body, with which the contact body engages on the locking unit in order to realize a form-fitting connection. Alternatively or additionally, the contact body can be connected to the locking unit via a fastening element, for example a screw.

In a particularly preferred manner, a stop can be formed on the contact sleeve, with which the contact sleeve on the locking unit engages. A positioning aid and optionally a form-fitting connection is thus created with simple means.

Furthermore, it is conceivable that the contact is connected to the contact body and/or to the locking unit via a fastening element, for example a screw.

In a further advantageous manner, the locking unit can have a union nut and a threaded ring, wherein the union nut is connected to the threaded ring via a grounding ring or a shield ring. A stop could also be formed on the grounding ring or the shield ring and on the union nut in order to realize a form-fitting connection.

In a particularly advantageous manner, a recess can be formed in the threaded ring and in the grounding ring or the shield ring. A retaining ring can engage in these recesses of the threaded ring and of the grounding ring or the shield ring in order to connect the threaded ring to the grounding ring or to the shield ring. Alternatively or additionally, at least one snap element can be formed on the grounding ring or on the shield ring, which engages behind on a projection of the threaded ring.

Furthermore, it should be pointed out that the aforementioned features of the method according to the disclosure can also be instantiated as a device. A combination of these features with the features relating to the electrical connector is not only possible, but advantageous.

BRIEF DESCRIPTION OF THE SEVERAL VIEWS OF THE DRAWINGS

There are various possibilities for designing and developing the teaching of the present disclosure in an advantageous manner. To this end, reference should be made to the following description of preferred exemplary embodiments of the disclosure with the aid of the drawings, on the basis of which the method according to the disclosure is also described. In connection with the explanation of the preferred exemplary embodiments of the disclosure based upon the drawings, generally preferred developments and further developments of the teaching are also explained.

DETAILED DESCRIPTION

Figure 1:
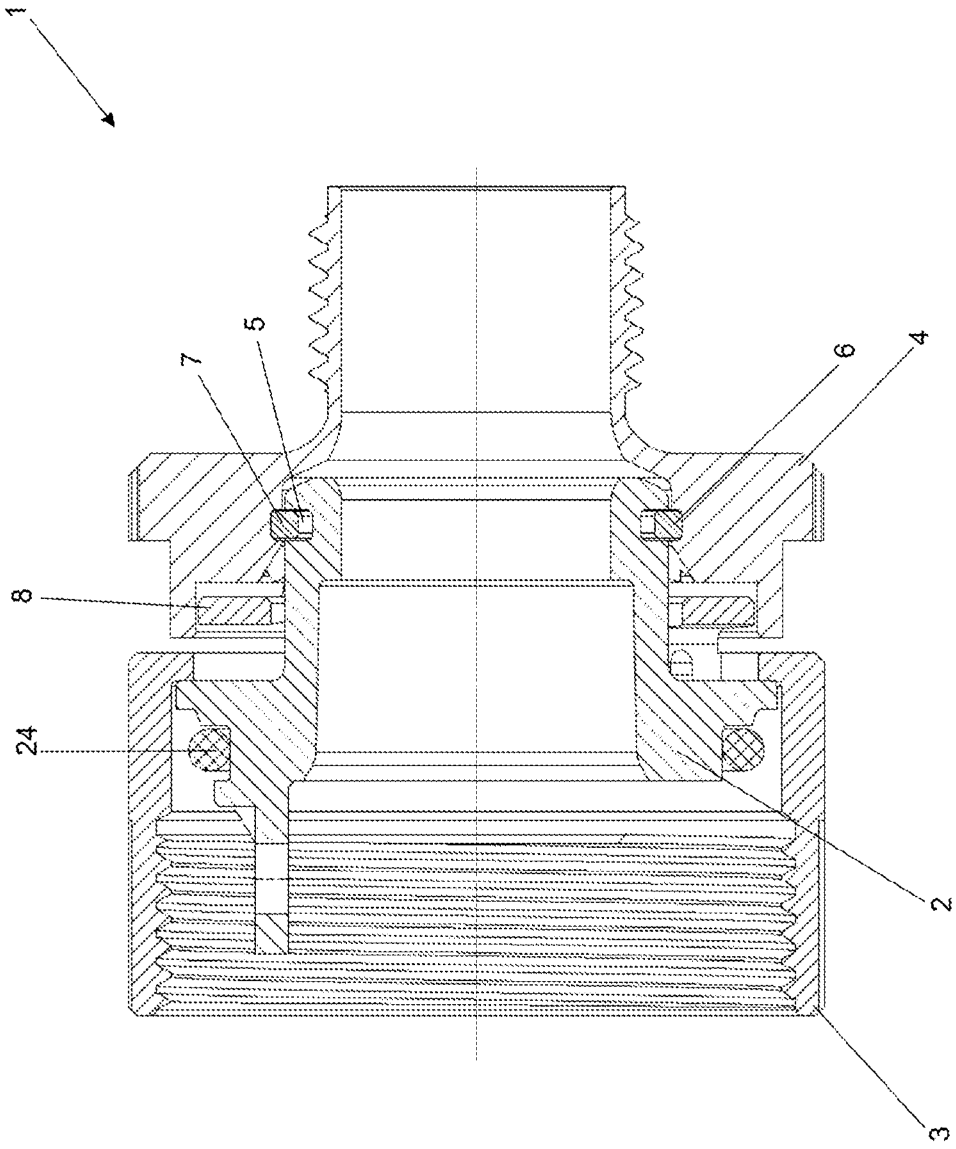
FIG. 1 shows a schematic, sectional view of an exemplary embodiment of a locking unit of an electrical connector according to the present disclosure.

FIG. 1 shows in a schematic, sectional view an exemplary embodiment of a locking unit 1 with a protective earth (PE) connection of an electrical connector according to the present disclosure. This pre-assemblable assembly comprises a grounding ring 2, a union nut 3, and the threaded ring 4.

A recess 5, 6 or a groove in which a retaining ring 7 engages and connects these components to one another is formed in the threaded ring 4 and the grounding ring 2. Other designs for connecting threaded ring 4 and grounding ring 2 are also conceivable.

To preassemble this assembly, the union nut 3 can be pushed onto the grounding ring 2. A corrugated spring washer 8 can then be inserted, and the threaded ring 4 can be pressed onto the grounding ring 2. The retaining ring 7 connects these two components. The intermediate corrugated spring washer 8 realizes a permanent electrical contact between the union nut 3 and the threaded ring 4 and thus ensures an electromagnetic compatibility (EMC) shielding.

Figure 2:
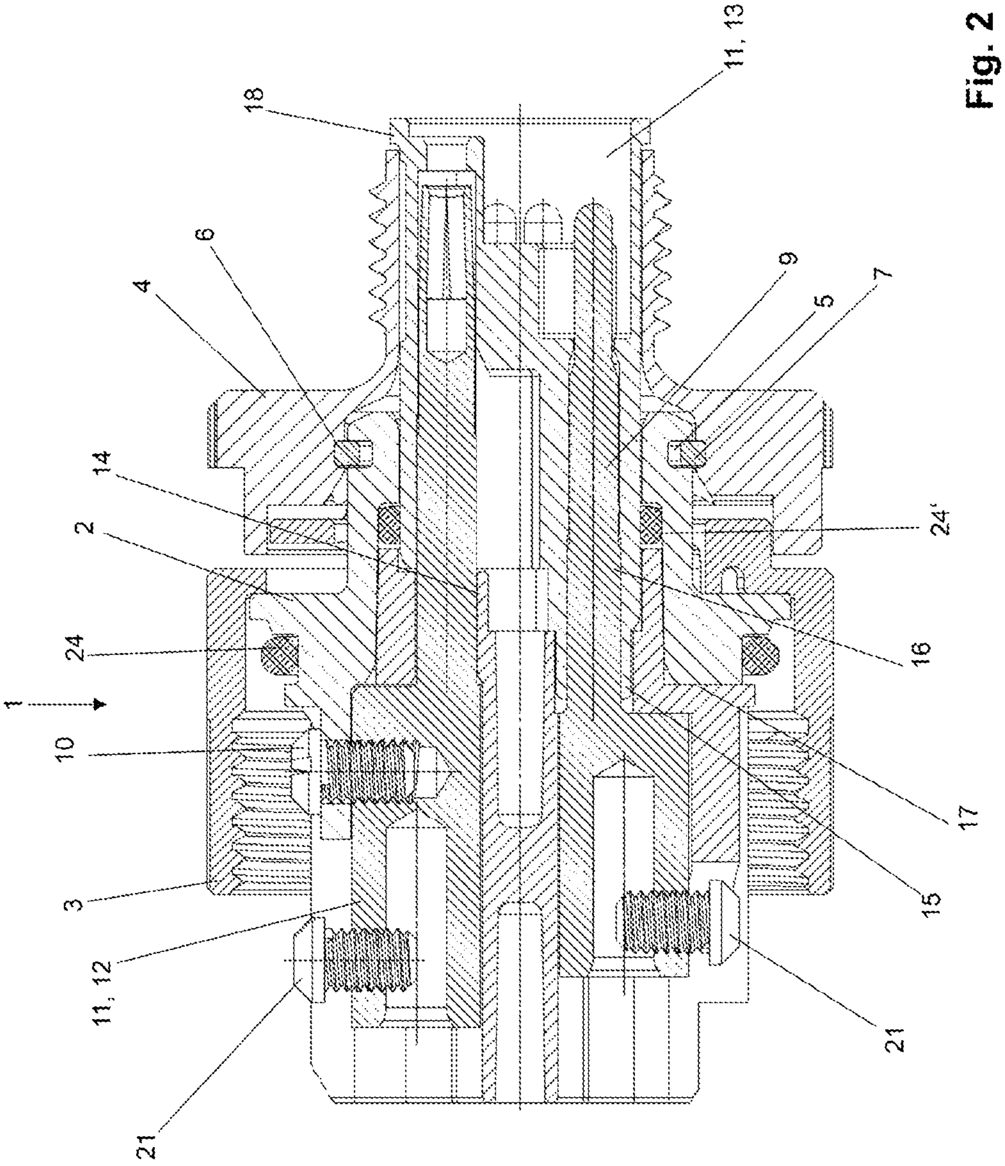
FIG. 2 shows a schematic, sectional view of an exemplary embodiment of an electrical connector according to the present disclosure with the locking unit according to FIG. 1.

According to FIG. 2, the connection of grounding ring 2 and contact 9 can be designed as a threaded clamping contact and be realized by means of a screw 10. This screw 10 can be tightened by means of a screwdriver, which could be inserted through an optional opening in the union nut 3.

The components of the locking unit 1 can thus also be mounted directly on the contact insert 11. When the electrical connector is being assembled by the user, the exposed wire is inserted into the contact 9 and fastened by means of a further screw.

Furthermore, it is also possible for assembly to pull the retaining ring 7 onto the grounding ring 2. The O-ring 24 can then be mounted on the grounding ring 2, and the O-ring 24' can be inserted into the grounding ring 2. The contact body 12 is inserted into the grounding ring 2, and then the contact 9 is inserted and fastened to the grounding ring 2 via a screw 10. The union nut 3 can then be put on, and the threaded ring 4 can be pressed on over the retaining ring 7. In a next step, the contact sleeve 13 can be inserted and the remaining contacts 9 are pressed in so that the connection-side and mating-side parts of the contact insert 11 are connected to one another. Furthermore, the screws 21 for clamping the wire can be screwed in.

It can be clearly seen in FIG. 2 that the contact insert 11 is formed from a contact body 12 and a contact sleeve 13. The contact body 12 has a probe region 14 which is introduced into a receiving region 15 of the contact sleeve 13. The contact body 12 and the contact sleeve 13 are connected to one another by the holding elements 16 of the contacts 9, which elements in this exemplary embodiment are formed as circumferential holding claws. Furthermore, the contact body 12 and the contact sleeve 13 in each case have a stop 17, 18.

Figure 3:
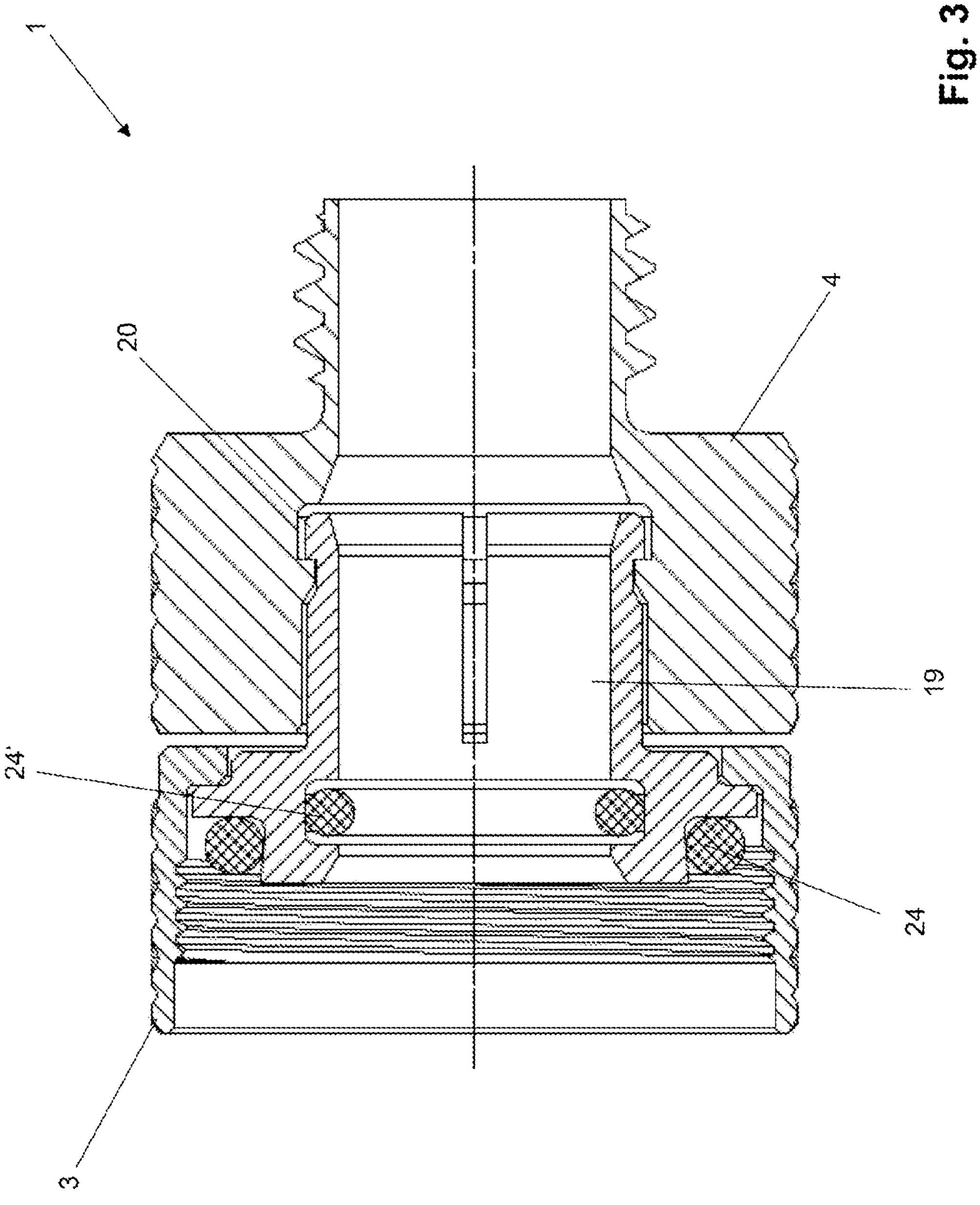
FIG. 3 shows a schematic, sectional view of a further exemplary embodiment of a locking unit of an electrical connector according to the present disclosure.

FIG. 3 shows a further exemplary embodiment of a locking unit 1, wherein it has no PE connection. This pre-assemblable assembly comprises the grounding ring 2, the union nut 3 and the threaded ring 4.

To assemble the locking unit 1, the union nut 3 is pushed onto the shield ring 19. The threaded ring 4 is then pressed onto the shield ring 19, which in turn has a plurality of flexible snap-in elements 20.

When the contact insert 11 is fully assembled, the threaded ring 4 can therefore no longer be released, because the inserted contact insert 11 locks the snap-in elements 20 of the shield ring 19. The assembly of the electrical connector by the customer is carried out analogously as described in FIG. 1. It is pointed out that in the case of the exemplary embodiment shown in FIG. 1, the grounding ring 2 can be designed as a shield ring 19 and that in the exemplary embodiment shown in FIG. 3, the shield ring 19 can be designed as a grounding ring 2.

Figure 4:
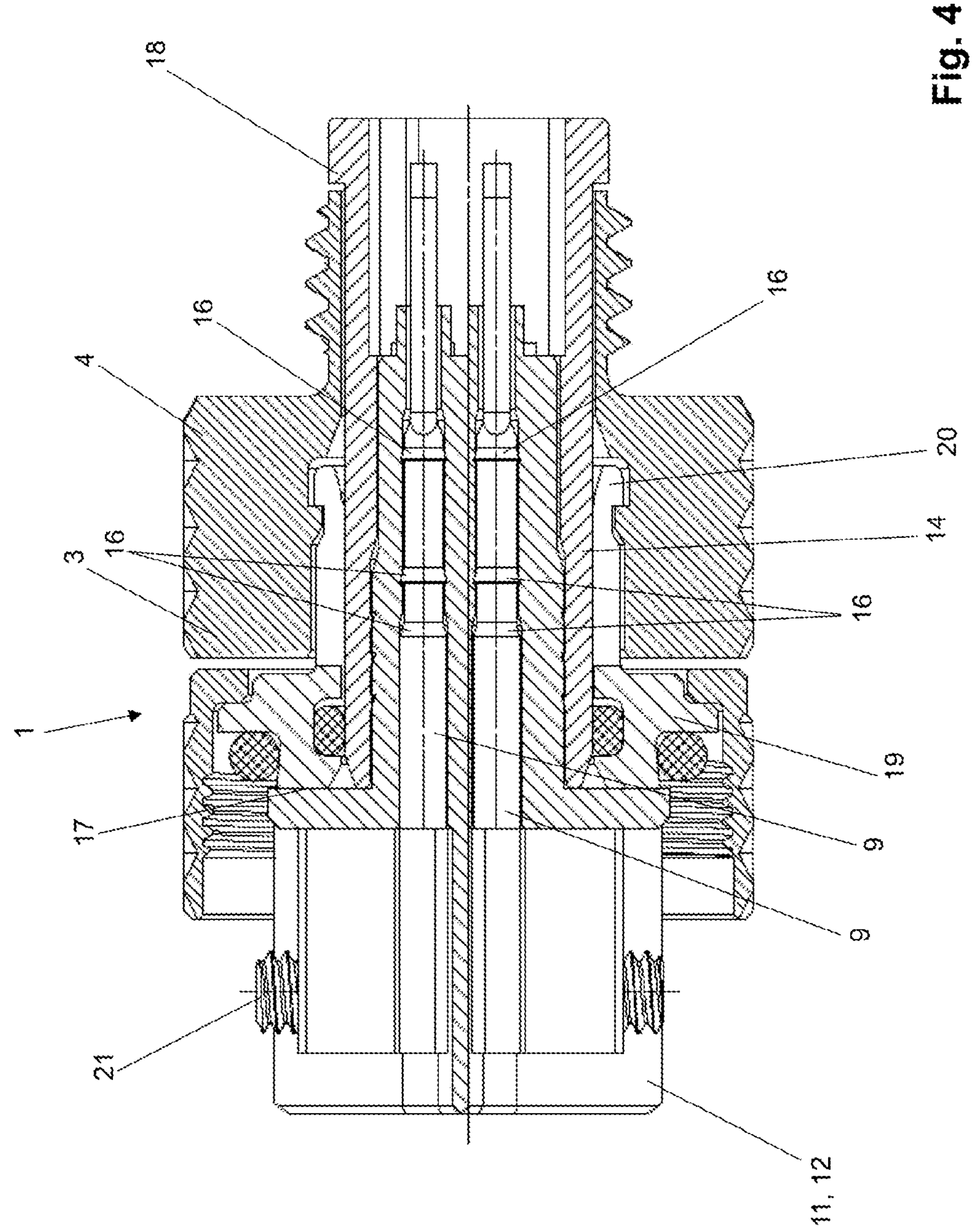
FIG. 4 shows a schematic, sectional view of an exemplary embodiment of an electrical connector according to the present disclosure with the locking unit according to FIG. 3.

FIG. 4 shows an exemplary embodiment of an electrical connector according to the disclosure with the locking unit 1 according to FIG. 3. The contact insert 11 is formed from the contact body 12 and the contact sleeve 13, each of which has a stop 17, 18. The contact insert 11 and the contact body 12 are fastened to one another via the contacts 9, for which purpose holding elements 16 are formed. Since the material of the contact insert 2 flows around the holding elements 16 during assembly, a form fit is achieved. In addition, holding elements 16' are formed on an inner side of the contact sleeve 13.

The shielding is transmitted substantially by the threaded connections 21. The threaded ring 4 is in turn mechanically and electrically connected to the shield ring 2 and the latter to the union nut 3. Optionally, however, a corrugated spring washer can also be provided between the union nut 3 and the threaded ring 4 in order to improve the shielding.

Figure 5:
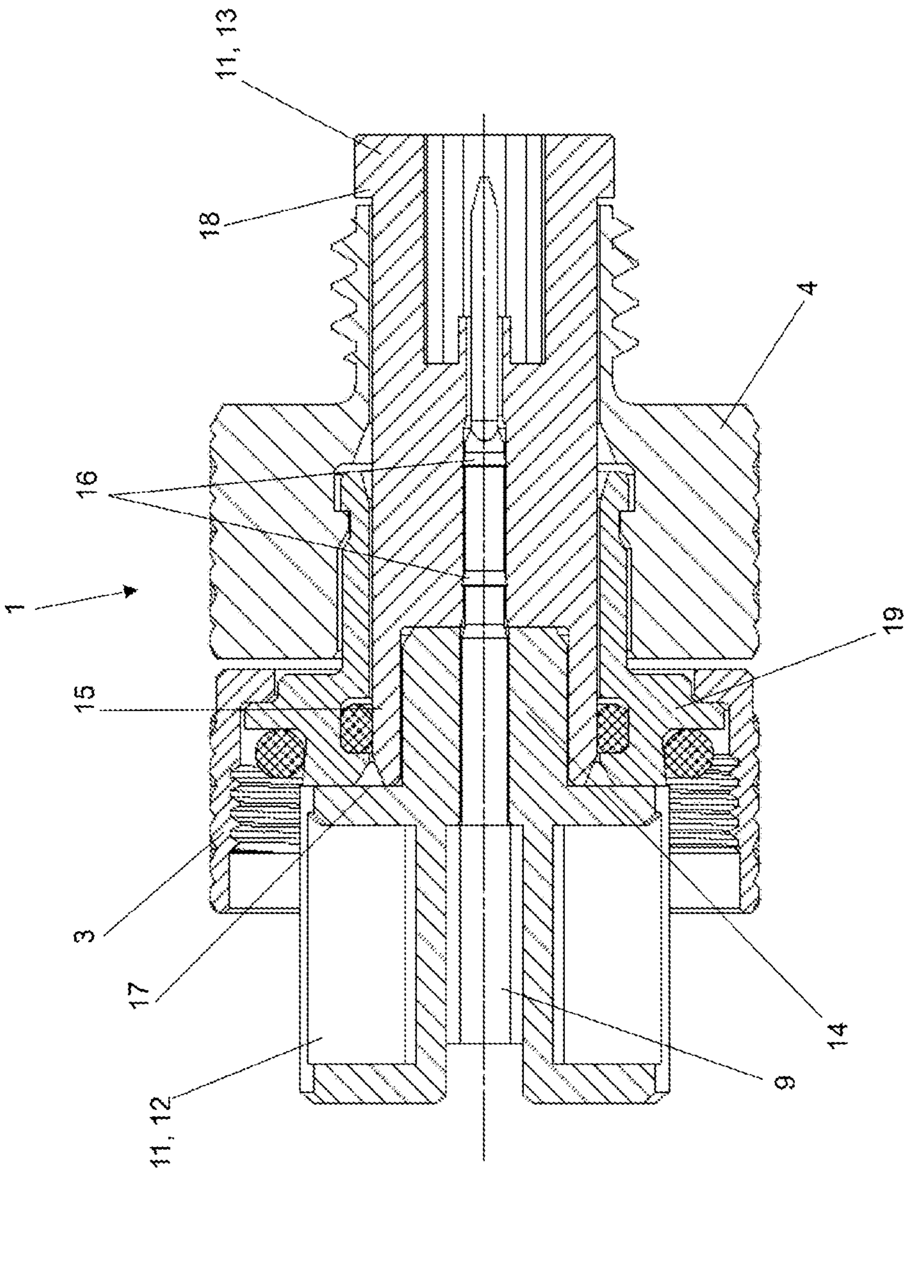
FIG. 5 shows a schematic, sectional view of a further exemplary embodiment of an electrical connector according to the present disclosure with the locking unit according to FIG. 3.

FIG. 5 shows a further exemplary embodiment of an electrical connector according to the disclosure with the locking unit 1 according to FIG. 3.

In this case, the contact insert 11 is formed in two parts, namely the contact body 12 and the contact sleeve 13. These are fastened by the holding elements 16 of the contact 9 which are designed as circumferential holding claws. The two parts of the contact insert 11 are thus connected via the contact 9, so that the locking unit 1 is fastened captively between the stops 17, 18.

It can be clearly seen here that the probe region 14 and the receiving region 15 are relatively short in contrast to the exemplary embodiment shown in FIG. 4. The entire internal diameter is thus available for constructive design. This permits greater wall thicknesses, which benefits not only the production of the components, for example from plastic, but also the product requirements. The shielding is implemented analogously to the description of FIG. 4.

Figure 6:
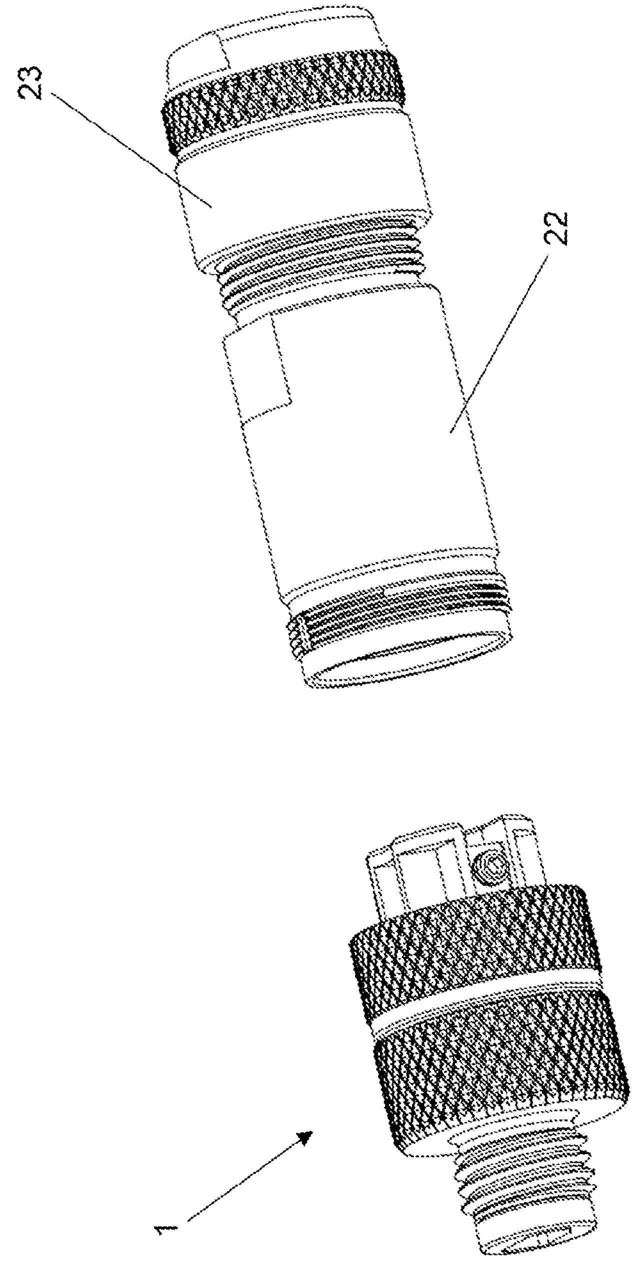
FIG. 6 shows a schematic perspective view of an exemplary embodiment of an electrical connector according to the present disclosure with a housing.

FIG. 6 shows the perspective view of the SPE connector, which has a preassembled electrical connector and a housing 22 with a cable gland. The cable gland has a pressure screw 23 and an internal clamping cage (not visible in this illustration).

The assembly of the connector by the user is carried out as follows: First, the housing 22 with cable clamping is threaded onto the cable that has already been cut to length. The wires are then exposed according to assembly instructions and fastened, for example screwed, to the contacts 9. The housing is then fastened to, in particular screwed onto, the locking unit 1. Finally, the pressure screw 23 is screwed tight so that the inner cable clamping is activated.

Figure 7:
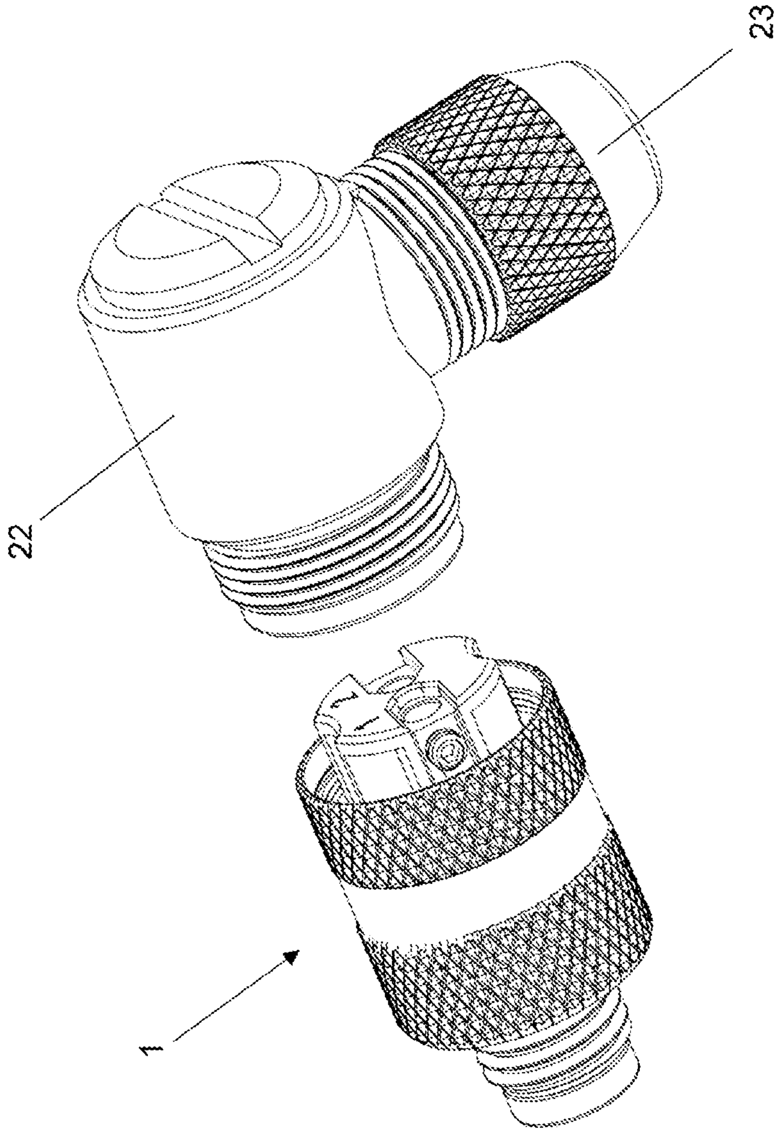
FIG. 7 shows a schematic perspective view of a further exemplary embodiment of an exemplary embodiment according to the present disclosure with a housing.

FIG. 7 shows a further exemplary embodiment of an electrical connector according to the present disclosure with a housing 22 which is designed as an angled housing.

It can be clearly seen here that the locking unit 1 can be used not only with a straight but also with an angled connector variant. In this case, assembly is carried out analogously to the exemplary embodiment according to FIG. 6.

With regard to other advantageous embodiments of the devices according to the present disclosure and of the method according to the present disclosure, in order to avoid repetitions, reference is made to the general part of the description and also to the appended claims.

Finally, it should be expressly pointed out that the above-described exemplary embodiments of the devices according to the present disclosure and of the method according to the present disclosure serve only for explaining the claimed teaching but do not limit it to the exemplary embodiments.

LIST OF REFERENCE SIGNS

1 Locking unit
2 Grounding ring
3 Union nut
4 Threaded ring
5 Recess (threaded ring)
6 Recess (grounding ring)
7 Retaining ring
8 Corrugated spring washer
9 Contact
10 Screw
11 Contact insert
12 Contact body
13 Contact sleeve
14 Probe region
15 Receiving region
16, 16' Holding element
17 Stop (contact body)
18 Stop (contact sleeve)
19 Shield ring
20 Snap element
21 Threaded connection
22 Housing
23 Pressure screw
24, 24' O-ring The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electrical connector, comprising:

a locking unit;

a contact insert at least partially surrounded by the locking unit, wherein at least one contact is arranged in and/or on the contact insert, wherein the contact insert is formed in two parts, namely a contact body and a contact sleeve connected to the contact body, and wherein the contact body and the contact sleeve are configured to be introduced into the locking unit on a connection side and on a mating side respectively; and at least one projecting holding element on an outer side of the at least one contact to achieve a form-fitting and/or force-fitting connection between the two parts of the contact insert and the at least one contact, wherein the two parts of the contact insert are connected via the contact so that the locking unit is captively fastened between a stop on the contact body and a stop on the contact sleeve.

2. The electrical connector according to claim 1, wherein the contact body has a probe region that is insertable into a receiving region of the contact sleeve.

3. The electrical connector according to claim 1, wherein the contact body is connected to the contact sleeve in a form-fitting and/or force-fitting manner.

4. The electrical connector according to claim 1, further comprising at least one additional projecting holding element on an inner side of the contact sleeve and/or on an outer side of the contact body to achieve a form-fitting and/or force-fitting connection between the contact sleeve and the contact body.

5. The electrical connector according to claim 1, wherein the contact insert is connected to the locking unit in a form-fitting and/or force-fitting manner.

6. The electrical connector according to claim 1, wherein the contact body is connected to the locking unit via a fastening element.

7. The electrical connector according to claim 1, wherein the stop on the contact sleeve provides a positioning aid.

8. The electrical connector according to claim 1, wherein the at least one contact is connected to the contact body and/or to the locking unit via a fastening element.

9. The electrical connector according to claim 1, wherein the locking unit comprises a union nut and a threaded ring, wherein the union nut is connected to the threaded ring via a grounding ring or a shield ring.

10. The electrical connector according to claim 9, further comprising a stop on the grounding ring or the shield ring, and also on the union nut, in order to achieve a form-fitting connection.

11. The electrical connector according to claim 9, further comprising a recess formed on the threaded ring and also on the grounding ring or the shield ring, and a retaining ring in these recesses in order to connect the threaded ring to the grounding ring or the shield ring.

12. The electrical connector according to claim 9, further comprising at least one snap element formed on the grounding ring or the shield ring, wherein the at least one snap element engages behind a projection of the threaded ring.

13. A contact insert for an electrical connector according to claim 1, comprising the contact body and the contact sleeve connected to the contact body.

14. A method for producing a device according to claim 1, comprising:

providing the contact sleeve, pushing the locking unit onto the contact sleeve, inserting the contact body into the locking unit up to the contact sleeve, and introducing the at least one contact into the contact body.

15. The method according to claim 14, wherein providing the contact sleeve includes inserting the contact sleeve into an assembly tool.

16. The method according to claim 14, wherein the locking unit is pushed onto the contact sleeve up to the stop on the contact sleeve.

17. The method according to claim 14, wherein inserting the contact body into the locking unit up to the contact sleeve includes inserting a probe region of the contact body into a receiving region of the contact sleeve.

18. The electrical connector according to claim 1, wherein the contact sleeve has a probe region that is introducible into a receiving region of the contact body.

19. The electrical connector according to claim 1, wherein the at least one contact is connected to the contact body and/or to the contact sleeve in a form-fitting and/or force-fitting manner.

* * * * *